(12) United States Patent
Vullers et al.

(10) Patent No.: US 7,183,887 B2
(45) Date of Patent: Feb. 27, 2007

(54) CONTROL MEANS AND METHOD OF CONTROLLING A CURRENT THROUGH A COIL

(75) Inventors: Rudolf Johan Maria Vullers, Eindhoven (NL); Willem Johannes Antonia Geven, Eindhoven (NL); Coen Theodorus Hubertus Fransiscus Liedenbaum, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 224 days.

(21) Appl. No.: 10/519,050

(22) PCT Filed: Jun. 13, 2003

(86) PCT No.: PCT/IB03/02864

§ 371 (c)(1),
(2), (4) Date: Dec. 22, 2004

(87) PCT Pub. No.: WO2004/003914

PCT Pub. Date: Jan. 8, 2004

(65) Prior Publication Data

US 2005/0259346 A1 Nov. 24, 2005

(30) Foreign Application Priority Data

Jul. 1, 2002 (EP) .................................. 02077609

(51) Int. Cl.
*H01F 27/08* (2006.01)
*G01R 5/22* (2006.01)
*G01R 19/32* (2006.01)
*G01R 21/14* (2006.01)
*G05D 23/00* (2006.01)
*G01K 7/00* (2006.01)
*G05B 11/01* (2006.01)
*G05B 9/02* (2006.01)

(52) U.S. Cl. .......................... 336/179; 700/21; 700/79; 700/293; 700/299; 324/104; 324/106; 361/93.8; 361/103; 361/140; 374/183

(58) Field of Classification Search .................. 700/21, 700/22, 79, 286, 292, 293, 299; 324/104–106; 336/177, 179; 360/69; 361/93.8, 103, 106, 361/140, 143; 374/100, 163, 183
See application file for complete search history.

(56) References Cited

U.S. PATENT DOCUMENTS

| 6,111,379 A | 8/2000 | Feldtkeller |
| 6,128,174 A * | 10/2000 | Ritter et al. ................. 361/143 |
| 6,229,663 B1 * | 5/2001 | Yoneda et al. ................ 360/75 |
| 6,380,861 B2 * | 4/2002 | Estelle et al. ............... 340/588 |

FOREIGN PATENT DOCUMENTS

| DE | 10057375 C1 | 11/2000 |
| JP | 02273354 | 1/1991 |

* cited by examiner

*Primary Examiner*—Crystal J. Barnes
(74) *Attorney, Agent, or Firm*—Michael E. Belk

(57) ABSTRACT

An electronic circuit comprising means (CMNS) for controlling a current (IL) through a coil (L) for the generation of a magnetic field (H). The means (CMNS) comprise means (DMNS) for the determination of a parameter which is a measure for the value of the resistance (RL) of the coil (L). During operation the maximum absolute value of the current (IL) is decreased when the parameter exceeds a certain limit.

8 Claims, 3 Drawing Sheets

CONTROL MEANS AND METHOD OF CONTROLLING A CURRENT THROUGH A COIL

BACKGROUND OF THE INVENTION

1. Field of the Invention

The invention relates to an electronic circuit comprising control means for controlling a coil current through a coil for the generation of a magnetic field.

2. Description of Related Art

Such an electronic circuit is known inter alia from a Japanese patent published under no. JP-02-273354. A recording/playback apparatus with a magneto-optical disc is shown therein, provided with a coil for generating a magnetic field. The invention describes in JP-02-273354 has the object of suppressing the heat generation of the coil and preventing a quality deterioration of components of the apparatus and of the magneto-optical disc. These objects are achieved by the provision of a temperature sensor in the vicinity of the location where the temperature must not become too high. The signal originating from the temperature sensor is processed electronically such that the current through the coil can be reduced if the measured temperature is too high.

A disadvantage of the known electronic circuit is that an additional sensor is necessary for measuring the temperature to be checked. Such sensors are comparatively expensive.

SUMMARY OF THE INVENTION

It is accordingly an object of the present invention to provide an electronic circuit comprising control means for controlling a coil current through a coil, provided with means for adapting the coil current in dependence on the temperature of the coil without an additional sensor being necessary for this.

According to the invention, the electronic circuit mentioned in the opening paragraph is for this purpose characterized in that the control means comprise detection means for determining a parameter which is a measure for the resistance value of the coil, and in that the maximum absolute value of the coil current is lowered when the parameter exceeds a given value in the operational state.

The invention is based on the recognition that the resistance value of the series resistance (always present, but undesirable in principle) of the coil increases with an increasing temperature of the coil. The determination of a parameter dependent on said resistance value renders it possible to adapt the coil current after electronic processing of the value of this parameter, for example to reduce the coil current if the temperature is too high. Burning-through of the coil can thus be prevented. The risk of burning-through of the coil is comparatively high in present-day magneto-optical disc recording/playback apparatuses, unless precautionary measures are taken. This is because a comparatively very high magnetic field strength is envisaged nowadays, and accordingly the coil for generating this field strength is loaded to its limits. This problem may arise in particular if the maximum possible magnetic field strength is to be obtained from the coil. The parameter may be a direct reflection of the resistance value of the coil, i.e. the parameter is equal to the resistance value of the coil. This, however, is not strictly necessary. A different relation between the parameter and the resistance value of the coil is also possible, for example a parameter rising quadratically with a rise in coil resistance.

A first embodiment of an electronic circuit according to the invention is characterized in that the control means comprise current means for providing the coil current, which is modulated in time between an extreme positive reference value and an extreme negative reference value, while the absolute values of the positive and negative reference values are lowered when the parameter exceeds a certain value.

It is achieved thereby that the current through the coil may be chosen in positive or in negative direction. This is necessary, for example, if the coil is used in a magnetic (-optical) disc recording/playback apparatus. This is because both positively and negatively directed magnetic domains are to be generated on the disc in this case.

A second embodiment of an electronic circuit according to the invention is characterized in that the current means comprise a set reference value for setting both the positive and the negative reference value.

This renders it possible to generate the positively and the negatively directed domains with approximately the same strength, for example in the application of the coil mentioned above. This is of importance in particular if the coil is to generate the maximum field strength. The temperature of the coil then has the maximum admissible value. If a comparatively great imbalance were present between the absolute values of the two current directions through the coil in this situation, for example, the negatively directed domain would be generated much more weakly than the positively directed domain. This may then have the result that the strength of the negatively directed domain lies below the minimum required value. It is accordingly advisable in general to make the absolute values of the positive and the negative reference values equal as much as possible. The current means can also be given a simpler construction then, inter alia because only one set reference value is necessary for setting both the positive and the negative reference value.

A third embodiment of an electronic circuit according to the invention is characterized in that the detection means comprise conversion means for converting the coil voltage across the coil into a unipolar signal value for setting the set reference value.

In fact, the absolute values of the coil current are used here as a reference for determining the set reference value.

A fourth embodiment of an electronic circuit according to the invention is characterized in that the coil is a thin-film coil.

A thin-film coil is widely used in magneto-optical recording/playback heads of high-density magneto-optical disc recording/playback apparatuses. In such an apparatus, the recording/playback head is moved very close, for example between 1 and 20 microns, to a recording/playback layer of the disc. The maximum magnetic field that can be generated is dependent on the temperature of the coil in the recording/playback head. This temperature is not only dependent on the current strength through the coil. Indeed, if the cooling of the coil is improved by its immediate surroundings, the temperature will drop. The current strength may then be chosen to be higher. The coil is capable of generating a stronger magnetic field as a result of this. It is found that a very short distance between the coil (recording/playback head) and the disk has a strong positive influence on the cooling of the coil. How good the cooling is, however, depends on a number of factors such as: the distance between head and disc, the type of head, and the speed of rotation of the disc. It is accordingly difficult in general to predict what the maximum admissible current strength through the coil will be. It is exactly for this reason that the application of the present invention is advantageous. The parameter related to the coil temperature is automatically determined in this case, whereupon the result is used for setting the correct current strength through the coil, without the use of an additional temperature sensor.

Various types of thin-film coils may be used. The international patent application published under no. WO 01/82299 A1 from the same applicant as the present patent application gives an example of a particularly advantageous thin-film coil which may be used in conjunction with the present invention. The coil is shown in FIG. 1 and is extensively described on p. 5, 1. 22 to p. 6, 1. 11 in WO 01/82299 A1.

It should be noted that the electronic circuit according to the invention may be used in appliances other than those mentioned above. The coil may be, for example, a so-called slide coil in a (purely) optical CD system.

The invention also relates to a method of controlling a current through a coil, whereby a parameter is determined which is a measure for the resistance value of the coil, and whereby the maximum absolute value of the coil current is reduced when the parameter exceeds a certain value.

The German patent published under no. DE10057375C1 shows control means which monitor the temperature of one or several coils in an apparatus or machine such as, for example, an electric motor. The power supplied is to be controlled so as to control the rpm value of the electric motor. This is done, for reasons of efficiency, in that a pulsatory current (or voltage) is supplied to the motor. The speed is then controlled through variation of the duty cycle of the pulsatory current. The amplitude of the current is kept constant during this. In DE10057375C1, the temperature of the series resistance of the coil is also determined so as to trim back the power of the electric motor without an additional sensor. This is done through adaptation of said duty cycle and not through adaptation of the current amplitude.

It should be noted that such a duty cycle control cannot be used in a magnetic (-optical) disc recording/playback apparatus because the information to be registered would then be partly or wholly lost.

BRIEF DESCRIPTION OF THE DRAWINGS

The invention will be explained in more detail below with reference to the accompanying drawing, in which.

Identical components or elements have been given the same reference symbols in these Figures.

DETAILED DESCRIPTION OF PREFERRED EMBODIMENTS

Figure 1:
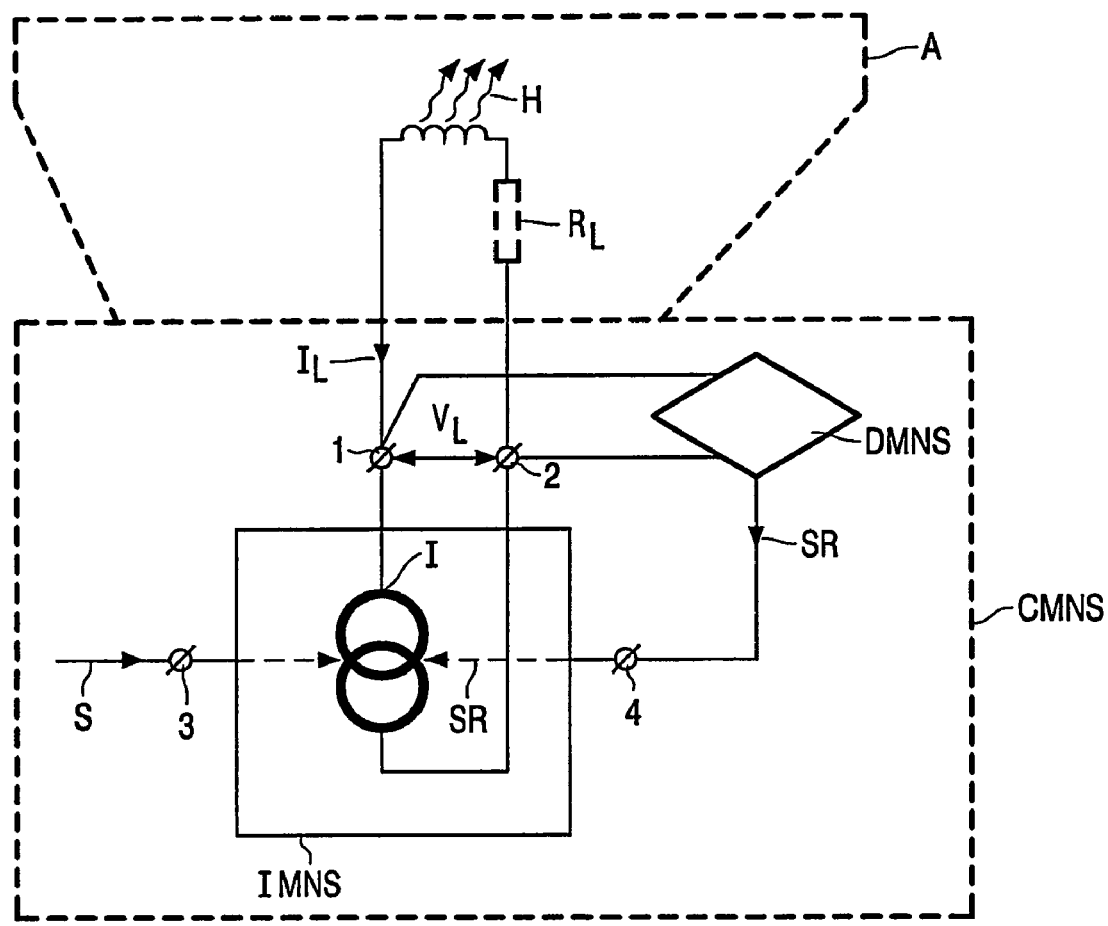
FIG. 1 shows the principle of the control means for controlling the coil current.

FIG. 1 shows the principle of the control means CMNS for controlling the coil current $I_L$ used in an apparatus A, such as a magneto-optical disc recording/playback apparatus. The control means CMNS comprise current means IMNS with a first input terminal 3 for receiving an input signal S, a second input terminal 4 for receiving a set reference signal SR, and first and second output terminals 1 and 2 for providing a coil current $I_L$ through a coil L which is connected between the output terminals 1 and 2. The series resistance $R_L$ of the coil L is indicated with broken lines. The control means CMNS further comprise detection means DMNS which measure a coil voltage $V_L$ between the terminals 1 and 2 and which supply the set reference signal SR in response thereto.

The operating principle of the invention is as follows. Writing of information to a magnetic (-optical) disc in the apparatus A takes place through the generation of positively and negatively directed magnetic field strengths H arising from the coil L. The magnetic field H is generated in that the current $I_L$ is passed through the coil L. The coil current $I_L$ is supplied by the current source I. The information is represented in the input signal S, which is a digital binary signal. In principle, i.e. as long as the temperature of the coil L is lower than the maximum admissible temperature, both the current direction and the amplitude of the coil current $I_L$ are imposed by the input signal S. When the temperature of the coil L has become equal to the maximum admissible temperature, however, the detection means DMNS ensure that the coil current $I_L$ cannot increase any further, both in positive and in negative direction, through generation of the set reference signal SR. It is prevented thereby that the coil L can burn through. An additional advantage of the circuit is that a generation of the maximum admissible magnetic field strength at all times, should this be desirable, can be realized in a simple manner in that the amplitude of the input signal S is made so great that the maximum temperature of the coil L would certainly be exceeded without the presence of the detection means DMNS. The detection means DMNS will then ensure that the coil L always operates at its maximum admissible temperature.

Figure 2:
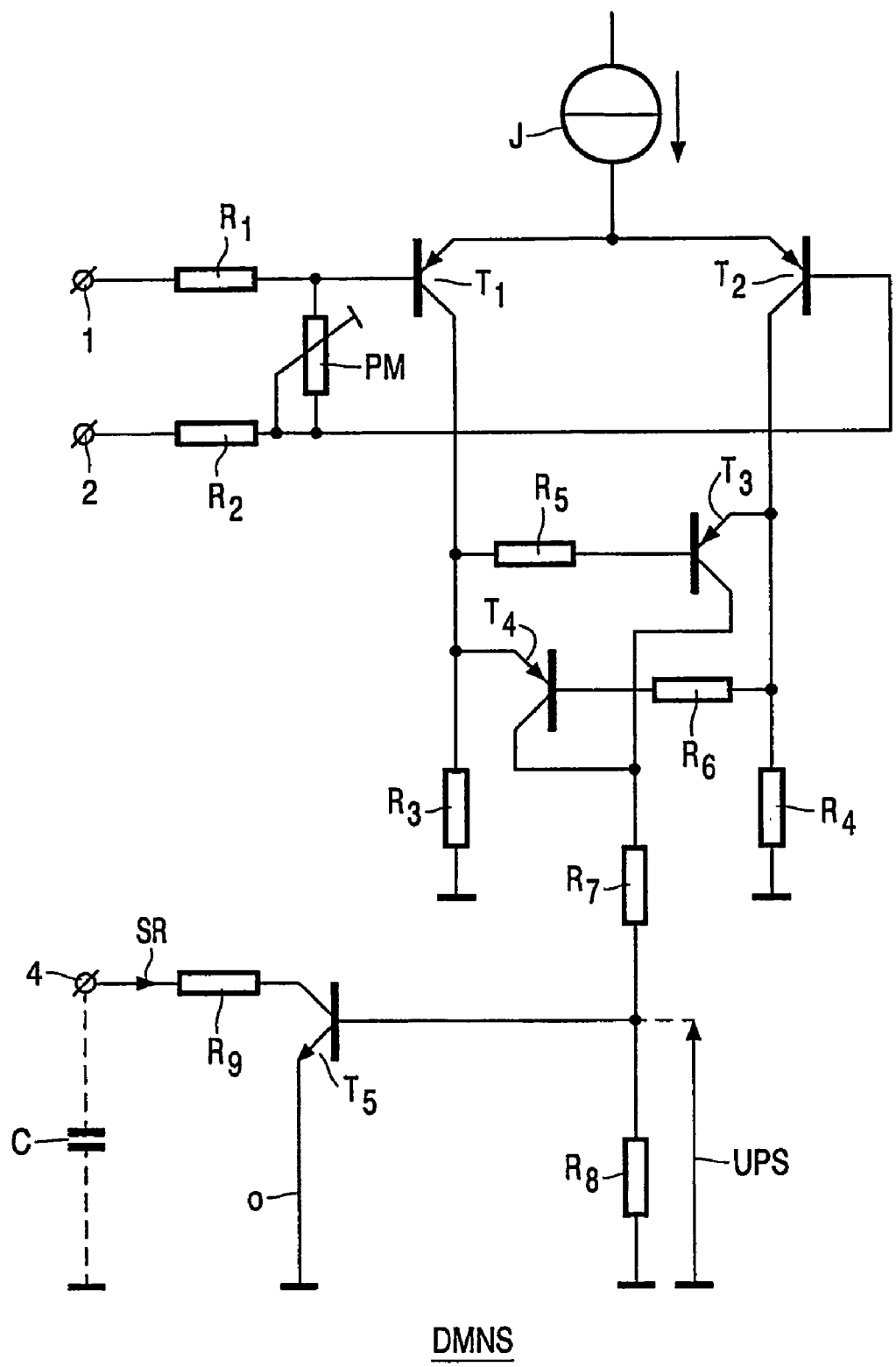
FIG. 2 is a circuit diagram of an embodiment of the detection means.

FIG. 2 is a circuit diagram of an embodiment of the detection means DMNS. The detection means DMNS comprise: current source J, p-type bipolar transistors $T_1$ to $T_4$, n-type bipolar transistor $T_5$, resistors $R_1$ to $R_9$, and adjustment potentiometer PM. The bases of the transistors $T_1$ and $T_2$ are connected to the terminals 1 and 2 via resistors $R_1$ and $R_2$, respectively. The adjustment potentiometer PM is connected between the bases of the transistors $T_1$ and $T_2$. The collectors of the transistors $T_1$ and $T_2$ are connected to terminal 0 (i.e. ground) via respective resistors $R_3$ and $R_4$. The emitters of the transistors $T_1$ and $T_2$ are interconnected in a common junction point which is coupled to the current source J. The emitter of the transistor $T_3$ is connected to the collector of the transistor $T_2$. The base of the transistor $T_3$ is connected to the collector of the transistor $T_1$ via the resistor $R_5$. The emitter of the transistor $T_4$ is connected to the collector of the transistor $T_1$. The base of the transistor $T_4$ is connected via the resistor $R_6$ to the collector of the transistor $T_2$. The collectors of the transistors $T_3$ and $T_4$ are interconnected. The emitter of transistor $T_5$ is connected to the terminal 0. The collector of the transistor $T_5$ is connected via the resistor $R_9$ to the terminal 4. The base of the transistor $T_5$ is connected via the resistor $R_7$ to the collector of the transistor $T_4$. The resistor $R_8$ is connected between the base and the emitter of the transistor $T_5$.

The operation of the circuit is as follows. The combination of the transistors $T_1$ to $T_4$, resistors $R_3$ and $R_4$, and current source J forms a differential amplifier. The combination of the resistors $R_1$ and $R_2$ and the adjustment potentiometer PM forms a voltage divider. The voltage between the terminals 1 and 2, which is accordingly the voltage $V_L$ across the coil L, is attenuated by the voltage divider. The attenuated voltage (across the adjustment potentiometer PM) forms a differential input voltage for the differential amplifier. The value of the differential input voltage is adjusted by the adjustment potentiometer PM. As a result, the eventual voltage transfer (amplification or attenuation)

from the coil voltage $V_L$ to a differential output voltage (between the collectors of transistors $T_1$ and $T_2$) can be adjusted. The combination of the transistors $T_3$ and $T_4$, the resistors $R_5$ and $R_6$, and the resistors $R_7$ and $R_8$ forms a conversion means which converts the differential output voltage into a unipolar voltage UPS between the base and the emitter of the transistor $T_5$. The voltage UPS is unipolar, i.e. the polarity of the voltage UPS is always the same and is not dependent on the polarity of the coil voltage $V_L$. It should be noted that the conversion means can only generate the unipolar voltage UPS if the differential output voltage is sufficiently high. In fact, the transistor $T_3$ or $T_4$ can only enter the conductive state to a significant degree if its base-emitter voltage lies above the so-termed threshold voltage. Whether or not the unipolar voltage UPS is generated depends on the value of the coil voltage $V_L$, the dimensioning of the resistors $R_1$ to $R_6$, and the setting of the adjustment potentiometer PM. Since the value of the coil voltage $V_L$ depends on the resistance value $R_L$ (see FIG. 1) of the coil L, which in its turn depends on the temperature of the coil L, the setting of the adjustment potentiometer PM may be chosen such that the unipolar voltage UPS is generated when a certain reference temperature is exceeded. The reference temperature may be, for example, equal to the maximum admissible temperature of the coil L, or it may be lower. The resistors $R_7$ and $R_8$ ensure that the unipolar voltage UPS cannot be excessively high. This prevents the transistor $T_5$ from becoming defective owing to a too high base-emitter voltage. The moment the unipolar voltage UPS is generated, the transistor $T_5$ will become conducting, whereby the set reference signal SR is generated. As a result, the coil current $I_L$ supplied by the current source I cannot increase any further (see also FIG. 1). The unipolar voltage UPS or the set reference signal SR may also be used, if so desired, for indicating in the apparatus A that the temperature of the coil L is at its maximum, for example by means of a lamp or LED.

The coil current $I_L$ is a high-frequency square-wave current (for example f=100 MHz). Since the cycle time (T=1/f) of the square-wave current is much greater than the time constant of the coil L, which is equal to $L/R_L$, the coil voltage $V_L$ is a square-wave voltage by approximation. During the switch-over of the polarity of the coil voltage $V_L$, however, there will be a short (with respect to the $L/R_L$ time constant) voltage peak caused by the self-induction of the coil L. It is conceivable that this voltage peak has a disturbing effect on the control means CMNS. To avoid such a disturbance, the resistor $R_9$ is included between the terminal 4 and the collector of the transistor $T_5$. The current means IMNS (see FIGS. 1 and 3) are connected to the terminal 4 and thus form a load applied to the terminal 4. Since this load has an at least partly capacitive character, it forms a low-pass filter in combination with the resistor $R_9$. Any high-frequency AC component that may be present in the set reference signal SR, for example owing to said voltage peak, is suppressed thereby. If so desired, the cut-off frequency of the low-pass filter may be lowered through the addition of a capacitor C between the terminal 4 and ground.

Figure 3:
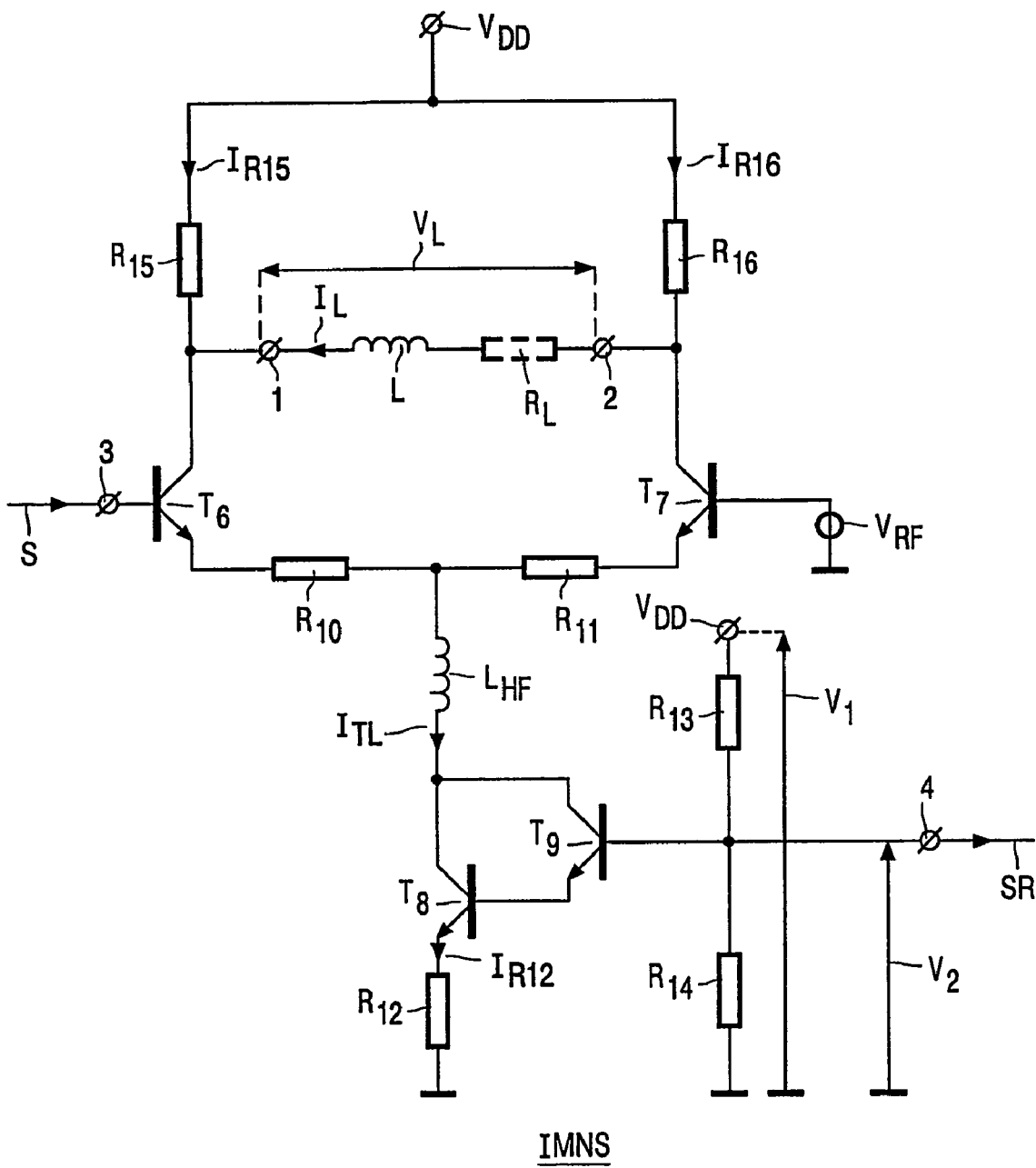
FIG. 3 is a circuit diagram of an embodiment of the current means.

FIG. 3 is a circuit diagram of an embodiment of the current means IMNS. The current means IMNS comprise n-type bipolar transistors $T_6$ to $T_9$, resistors $R_{10}$ to $R_{16}$, and a high-frequency choke coil $L_{HF}$. The collectors of transistors $T_6$ and $T_7$ are connected to the terminals 1 and 2, respectively. The base of the transistor $T_6$ is connected to the terminal 3. A voltage reference source $V_{RF}$ is connected between the base of the transistor $T_7$ and ground. The resistors $R_{10}$ and $R_{11}$ are connected in series and lie between the emitters of the transistors $T_6$ and $T_7$. The collector of the transistor $T_8$ is connected via the HF coil $L_{HF}$ to a common junction point of the resistors $R_{10}$ and $R_{11}$. The emitter of the transistor $T_8$ is connected to ground via the resistor $R_{12}$. The collector and the emitter of the transistor $T_9$ are connected to the collector and the base of the transistor $T_8$, respectively. The resistors $R_{13}$ and $R_{14}$ are connected in series between a supply terminal $V_{DD}$ and ground. The base of the transistor $T_9$ is connected to a common junction point of the resistors $R_{13}$ and $R_{14}$, and to the terminal 4. The voltage between the supply terminal $V_{DD}$ and ground is denoted $V_1$. The voltage across the resistor $R_{14}$ is denoted $V_2$. The terminals 1 and 2 are connected to the supply terminal $V_{DD}$ via respective resistors $R_{15}$ and $R_{16}$.

The circuit operates as follows. The circuit substantially forms a differential amplifier in which a tail current $I_{TL}$ is supplied (mainly) from the transistor $T_8$. The transistors $T_6$ and $T_7$ are brought into the conducting or non-conducting states in alternation by the input signal S, which contains the information for writing information to a disc in an apparatus A (see also FIG. 1). In the situation shown, the coil current $I_L$ has the current direction indicated because the potential at terminal 3, determined by the input signal S, is substantially higher than the potential at the base of the transistor $T_7$, which is determined by the voltage originating from the voltage reference source $V_{RF}$. In the present situation, the tail current $I_{TL}$ flows in its entirety through the emitter of the transistor $T_6$. The current strength of the coil current $I_L$ is equal to that of the current through the collector (which is substantially equal to the current through the emitter) of the transistor $T_6$ minus the current $I_{R15}$ flowing through the resistor $R_{15}$. Since the current through the transistor $T_9$ is much lower than the current through the transistor $T_8$, the tail current $I_{TL}$ is substantially equal to the current $I_{R12}$ through the resistor R12.

Now consider the situation in which no set reference signal SR is supplied, in other words, the situation in which the temperature of the coil L is lower than the maximum admissible temperature. The voltage $V_2$ is determined only by the value of the voltage $V_1$ and the quotient of the resistance values $R_{13}$ and $R_{14}$. (the base current of the transistor $T_9$ is assumed to be negligibly small). The voltage across the resistor $R_{12}$ is equal to the voltage $V_2$ minus the sum of the base-emitter voltages of the transistors $T_8$ and $T_9$. Since said sum is approximately constant (generally approximately 1.2 V), it is possible to lay down the voltage across the resistor $R_{12}$ accurately through a suitable choice of the resistance values of the resistors $R_{12}$ to $R_{14}$. The current $I_{R12}$, and accordingly the tail current $I_{TL}$, is accurately laid down thereby at the same time. The absolute value of the coil current $I_L$ can thus also be dimensioned.

Without the detection means DMNS it could happen that the value of the coil current $I_L$ resulting from a dimensioning in the situation described above is too high. This would then lead to a coil temperature lying above the maximum admissible value. This is prevented, however, in that the detection means DMNS (see FIG. 2) now provide the unipolar signal UPS, with the result that the set reference signal SR, in this example the set reference current SR, is supplied to the terminal 4. The presence of the set reference current SR has the result that the voltage $V_2$ is reduced. This also reduces the voltage across the resistor $R_{12}$, and eventually the coil current $I_L$ is automatically lowered to a value at which the temperature of the coil L is equal to the maximum admissible temperature.

A function of the HF coil $L_{HF}$ is to increase the AC impedance of the tail of the differential amplifier. This increases the so-termed CMRR (Common Mode Rejection Ratio). An additional positive effect of the use of the HF coil $L_{HF}$ is that any remaining influence of the voltage peak arising during the polarity switch of the coil voltage $V_L$ is still further suppressed.

The bipolar transistors in the control means CMNS may be replaced wholly or in part by field effect transistors. Instead of the conductivity types of the transistors as indicated, transistors with opposite conductivity types may be used. The polarities of the voltages and/or currents should then also be adapted, as applicable.

The control means may be implemented both in an integrated circuit and by means of discrete components.

The invention claimed is:

1. An electronic circuit comprising control means (CMNS) for controlling a coil current ($I_L$) through a coil (L) for the generation of a magnetic field (H), characterized in that the control means (CMNS) comprise detection means (DMNS) for determining a parameter which is a measure for the resistance value ($R_L$) of the coil (L), and in that the maximum absolute value of the coil current ($I_L$) is lowered when said parameter exceeds a given value in the operational state.

2. An electronic circuit as claimed in claim 1, characterized in that the control means (CMNS) comprise current means (IMNS) for providing the coil current ($I_L$), which is modulated in time between an extreme positive reference value and an extreme negative reference value, while the absolute values of the positive and negative reference values are lowered when the parameter exceeds a certain value.

3. An electronic circuit as claimed in claim 2, characterized in that the current means (IMNS) comprise a set reference value (SR) for setting both the positive and the negative reference value.

4. An electronic circuit as claimed in claim 3, characterized in that the detection means (DMNS) comprise conversion means for converting the coil voltage ($V_L$) across the coil (L) into a unipolar signal value (UPS) for setting the set reference value (SR).

5. An electronic circuit as claimed in claim 1, characterized in that the coil (L) is a thin-film coil.

6. An apparatus (A) comprising an electronic circuit as defined in claim 1.

7. A magneto-optical disc recording/playback apparatus (A) comprising an electronic circuit as defined in claim 1.

8. A method of controlling a current through a coil, whereby a parameter is determined which is a measure for the resistance value of the coil, and whereby the maximum absolute value of the coil current is reduced when said parameter exceeds a certain value.

* * * * *